US007818141B2

(12) United States Patent
Roth et al.

(10) Patent No.: US 7,818,141 B2
(45) Date of Patent: *Oct. 19, 2010

(54) VIBRATION DOSIMETER AND METHOD FOR DETERMINING THE DAILY VIBRATION EXPOSURE

(75) Inventors: Markus Roth, Wangen (DE); Andreas Strasser, Rudersberg (DE)

(73) Assignee: Robert Bosch GmbH, Stuttgart (DE)

( * ) Notice: Subject to any disclaimer, the term of this patent is extended or adjusted under 35 U.S.C. 154(b) by 81 days.

This patent is subject to a terminal disclaimer.

(21) Appl. No.: 11/914,775

(22) PCT Filed: Jan. 15, 2007

(86) PCT No.: PCT/EP2007/050338

§ 371 (c)(1),
(2), (4) Date: Nov. 19, 2007

(87) PCT Pub. No.: WO2007/098980

PCT Pub. Date: Sep. 7, 2007

(65) Prior Publication Data

US 2009/0140154 A1      Jun. 4, 2009

(30) Foreign Application Priority Data

Mar. 2, 2006   (DE) .................. 10 2006 009 657

(51) Int. Cl.
*G06F 19/00*   (2006.01)
*G06F 17/40*   (2006.01)
(52) U.S. Cl. .................. 702/176; 73/570; 73/865.1; 340/573.1; 702/34

(58) Field of Classification Search ............... 73/432.1, 73/570, 760, 763, 764, 787, 788, 794, 865.1, 73/865.4; 340/500, 540, 573.1, 665, 669; 702/1, 33, 34, 41, 42, 127, 176, 187, 189
See application file for complete search history.

(56) References Cited

U.S. PATENT DOCUMENTS

| | | | | |
|---|---|---|---|---|
| 2,920,480 | A * | 1/1960 | Haas | 73/787 |
| 3,237,448 | A * | 3/1966 | Howell et al. | 702/132 |
| 3,362,217 | A * | 1/1968 | Evans et al. | 73/112.01 |
| 3,517,177 | A * | 6/1970 | Crowell | 702/34 |

(Continued)

FOREIGN PATENT DOCUMENTS

AU          717448        3/2000

(Continued)

*Primary Examiner*—Edward R Cosimano
(74) *Attorney, Agent, or Firm*—Michael J. Striker

(57) ABSTRACT

The invention relates to a vibration dosimeter (2) and a method for determining the daily vibrational loading of persons who are exposed to mechanical oscillations at their place of work due to the operation of a work means and in particular of a manually operated electronic tool (4, 6). What is provided is that the dosimeter (2) comprises a determination device (12, 18) for determining the effective daily operating duration of the work means (4, 6), a computer device (22) for calculating a daily work time until a specified trigger value or exposition limit value of the vibrational loading is reached from a work-means-typical vibration value and the trigger value or exposition limit value, and a comparison device (24) for comparing the determined effective daily operating duration of the work means with the calculated daily work time until the specified trigger value is reached.

12 Claims, 5 Drawing Sheets

U.S. PATENT DOCUMENTS

| | | |
|---|---|---|
| 6,006,164 A | 12/1999 | McCarty et al. |
| 6,550,260 B1 | 4/2003 | Sullivan |
| 2003/0061825 A1 | 4/2003 | Sullivan |

FOREIGN PATENT DOCUMENTS

| | | |
|---|---|---|
| CN | 1410746 | 4/2003 |
| DE | 101 19 252 | 11/2002 |
| EP | 1 586 875 | 10/2005 |
| GB | 2 299 169 | 9/1996 |

* cited by examiner

Fig. 7
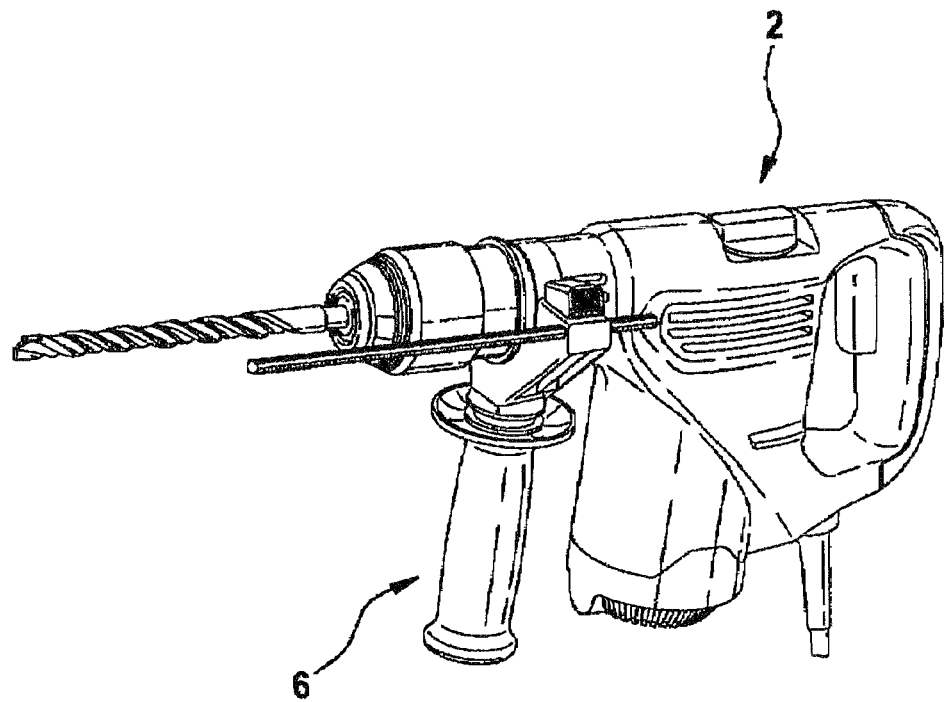
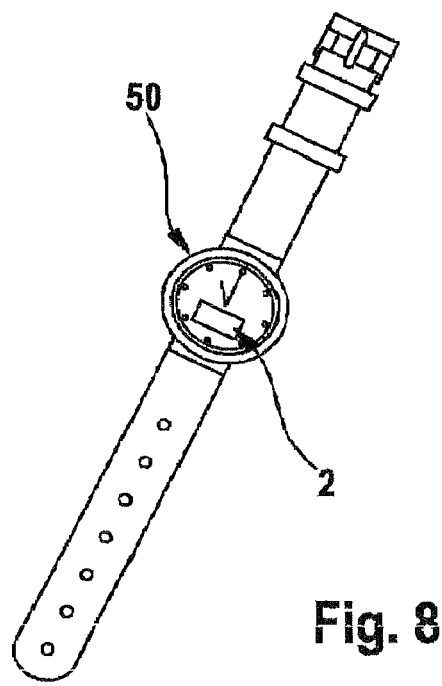
Fig. 8

VIBRATION DOSIMETER AND METHOD FOR DETERMINING THE DAILY VIBRATION EXPOSURE

BACKGROUND OF THE INVENTION

The invention relates to a vibration dosimeter and a method for determining the daily vibration exposure.

PRIOR ART

The European Parliament and the Council of the European Commission have concluded that it necessary to introduce measures for protecting workers from the risks arising from vibrations of tools owing to their effects on the health and safety of workers and have therefore set forth minimum requirements in Directive EU 2002/44, which prescribe certain steps to be taken when an employer exceeds a daily action value or a daily exposure limit value. According to the directive, the assessment as to the level of exposure can be carried out by means of an estimate based on manufacturer data regarding the magnitude of vibrations generated by the tools and by means of observation of the specific work practices or can be carried out by means of measurement. However, estimates are frequently very imprecise and are difficult for the worker himself to understand, while measurements are relatively expensive since they require a determination of the effective value of the frequency-weighted acceleration in three orthogonal directions, which must additionally be carried out for both hands in devices that are held or guided with both hands. This requires a relatively complex measurement setup that is different for each tool and which, in compliance with Standard 5349-2:2001, must be adapted to the particular features of the vibrations to be measured, environmental factors, and technical features of the measuring device so that when using such a method, it is very difficult to evaluate the degree of an individual exposure on site in the field.

EP 1 586 875 A1 has disclosed a vibration dosimeter that is adapted to the hand of a tool operator and is equipped with a sensor for measuring the vibration level to which the operator is exposed, a device for calculating the cumulative exposure, and a device for transmitting the recorded data to the operator.

In addition, DE 101 19 252 A1 has disclosed a device for a person-specific measurement of hand-arm and whole-body vibration exposure parameters in workplaces (vibration dosimeter), which, in addition to a detection of vibration measurement values, also permits a detection of other physical measurement values that are considered relevant to the effect of vibrations on the human body.

SUMMARY OF THE INVENTION

The vibration dosimeter according to the invention and the method according to the invention give workers a simple and reasonably priced option, without the use of expensive multidimensionally functioning acceleration sensors, for determining the daily vibration exposure from a tool used in the workplace and for determining whether the action value and exposure limit value set forth in EU Directive 2002/44 have been exceeded due to the use of the tool.

The concept underlying the invention is for the manufacturer to determine for each tool a vibration value typical of the tool and to indicate this value on the tool itself or in its instruction manual and, based on this vibration value typical of the tool and based on the action value and exposure limit value, to calculate a respective daily working time it takes to reach this action value and exposure limit value set forth in EU Directive 2002/44, which can then be compared with the effective daily operation time of the respective tool in order to determine whether either value has been exceeded.

Basically, the vibration dosimeter according to the invention and the method according to the invention can be used in any workplace in which a worker is exposed to hand-arm or whole-body vibrations, for example construction sites, where workers make frequent use of various vibration-generating tools over the course of a day.

In the context of the present application, the expression "effective daily operating time" is understood to essentially mean only the working time of the tool in which it generates powerful vibrations, in other words not idling time.

Another advantage of the vibration dosimeter according to the invention is that when working with various vibration-generating tools, it can be easily and quickly readjusted with each change of tools, only requiring the vibration value typical of the tool to be input into the dosimeter.

Like the action value and exposure limit value of EU Directive 2002/44, the vibration value typical of the tool is preferably an acceleration value that is expressed in units of $m/s^2$.

In a preferred embodiment of the invention, the vibration dosimeter has a display unit, which indicates that the prescribed vibration exposure action value or exposure limit value has been exceeded if the determined effective daily operating time of the tool or of each tool in the working state exceeds the calculated working time it takes to reach the prescribed vibration exposure action value or exposure limit value. The display unit can be a small display, for example an LCD display, but due to the vibration to which the dosimeter itself is exposed, it is preferable to provide a more rugged display unit equipped with at least two and preferably three differently colored light-emitting diodes. For example, a green light-emitting diode can be used, which, by lighting up, indicates that the determined effective daily operating time has not yet exceeded the calculated working time it takes to reach the prescribed action value, while an orange light-emitting diode is switched on when the determined effective daily operating time has in fact exceeded the calculated working time it takes to reach the prescribed action value, but has not yet exceeded the calculated working time it takes to reach the exposure limit value. A red light-emitting diode can be used to indicate that the calculated working time it takes to reach the exposure limit value has been exceeded.

If the operating time of the tool is interrupted for a longer period of time, for example longer than 8 hours, then the determined effective daily operating time of the tool or tools is preferably automatically reset to zero.

Preferably, the invention is used in connection with electrically driven tools such as hand-guided power tools since electrical devices permit the effective daily operating time to be determined with relative ease by means of the current consumption of the device in the working state.

In this case, the vibration dosimeter can either be suitably integrated into the device itself or into a power socket via which the respective device is connected to a power line or power grid. The latter variant has the advantage that when changing devices, the same power socket is used and therefore the vibration exposure generated by all of the devices used can be measured using the same dosimeter.

Alternatively, the vibration dosimeter can also be embodied so that the worker can either wear it in the form of a wristwatch or can fasten it to the respective device. In this case, a simple acceleration sensor suitably uses a reference measurement to determine the acceleration level of the device during idling operation and in the working state and stores to them in the dosimeter. Over the course of the whole workday, the dosimeter then displays whether the device is in the working state, the idling state, or the off state and compares the effective operating time of the device, which is determined based on them, to the daily working time it takes to reach the action value and exposure limit value, calculated from the vibration value typical of the tool.

In order to submit a report for compliance with EU Directive 2002/44 and/or in order to carry out a more precise analysis of the vibration exposure, the vibration dosimeter can be suitably provided with an interface such as a USB port or a memory card so that the working, idling, or off times of the device, together with the vibration value typical of the tool can be sent to a computer.

BRIEF DESCRIPTION OF THE DRAWINGS

Four exemplary embodiments of the invention will be explained in greater detail below in conjunction with the accompanying drawings.

FIG. 7 is a perspective view of the vibration dosimeter from FIG. 5 after it has been mounted onto a cordless rotary hammer;

FIG. 8 is a perspective view of a wristwatch with an integrated vibration dosimeter;

DETAILED DESCRIPTION OF THE EXEMPLARY EMBODIMENTS

Figure 1:
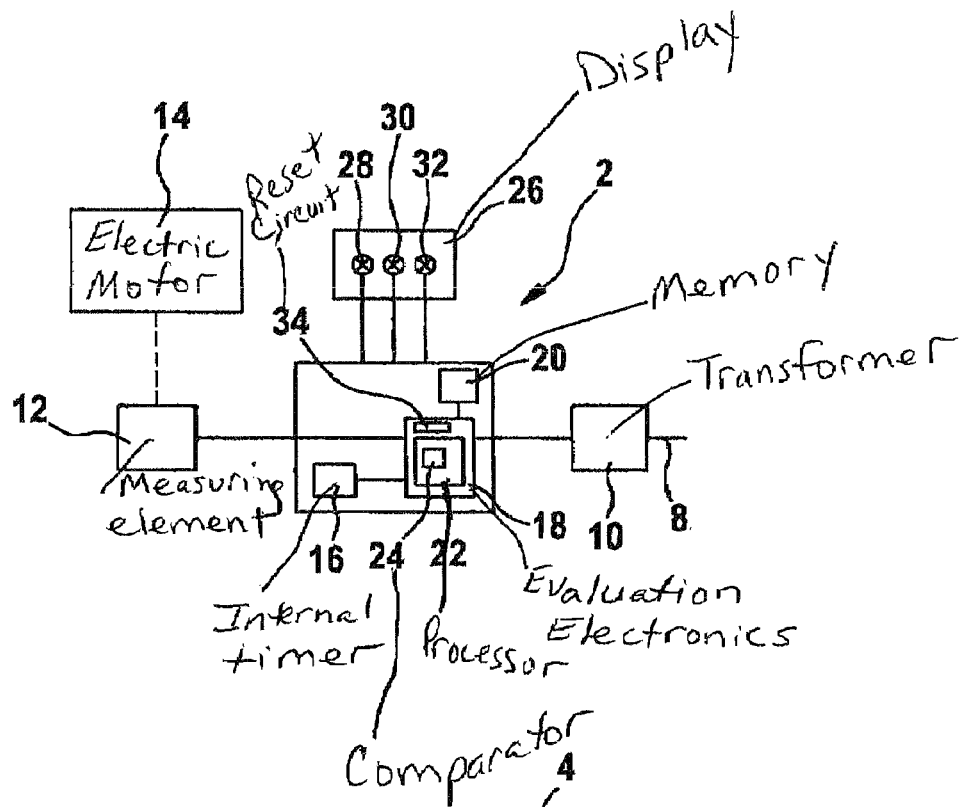
FIG. 1 is a schematic depiction of components of a vibration dosimeter integrated into a rotary hammer.

The drawings show several installation variants for a vibration dosimeter 2, which is used to determine the daily vibration exposure of a worker who works with a motor-driven tool, which is depicted by way of example in the drawings in the form of a corded rotary hammer 4 (FIG. 2) and a cordless rotary hammer 6 (FIG. 7). Since using these power tools 4, 6, particularly in the impact drilling or hammering mode, subjects the worker to considerable hand-arm vibrations, which with continuous exposure can negatively affect the health of the worker, the employer is obliged to carry out the steps set forth in EU Directive 2002/44 when the vibration exposure of the worker to hand-arm vibrations exceeds a daily action value of 2.5 m/s² and when it exceeds a daily exposure limit value of 5 m/s².

The vibration dosimeter 2 described below makes it possible to simply and inexpensively determine this vibration exposure and to determine when the action value and exposure limit value are exceeded.

Figure 2:
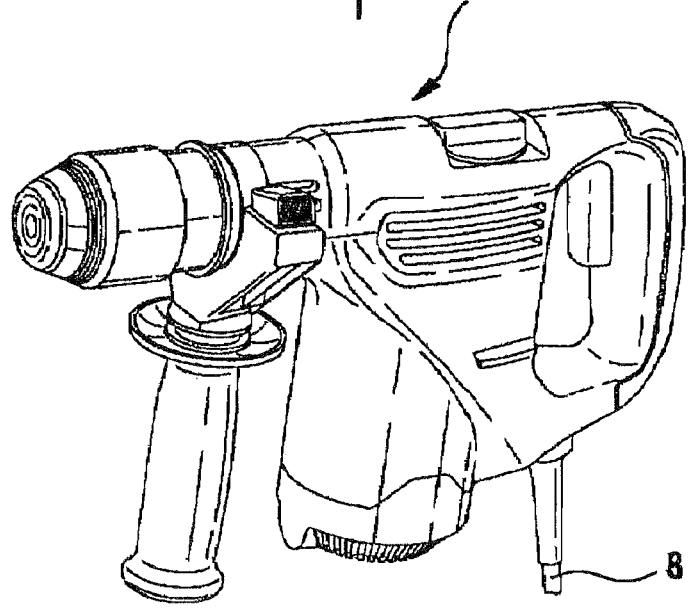
FIG. 2 is a perspective view of the rotary hammer.

The dosimeter 2 shown in FIGS. 1 and 2, which is integrated into the rotary hammer 4 and is fed power from the grid via the rotary hammer's power cable 8 and a transformer 10, includes at least one measuring element 12 for recording suitable operating parameters of the rotary hammer 4 such as the power consumption of its electric drive motor 14 and/or its speed as well as an internal timer 16 whose measurement values enable a determination of an effective daily operating time of the device 4 to be carried out in a set of evaluation electronics 18 of the dosimeter 2, i.e. the duration of time after start of operation that the device 4 is in the working state, which does not include idling times and off times. The dosimeter 2 or the evaluation electronics 18 also include(s) a memory 20 which stores a vibration value typical of the tool, which is determined by the manufacturer through measurements of the rotary hammer 4; like the action value and exposure limit value, this value is expressed in units of m/s². The evaluation electronics 18 also include a processor 22, which, based on the daily action value and exposure limit value and on the vibration value typical of the device, calculates a daily working time it takes to exceed the action value and exposure limit value according to the following equations:

$$AZ_A = \frac{8h \times 2.5 \text{ m/s}^2 \times 2.5 \text{ m/s}^2}{(V_{device})^2} \quad (1)$$

$$AZ_E = \frac{8h \times 5 \text{ m/s}^2 \times 5 \text{ m/s}^2}{(V_{device})^2}, \quad (2)$$

where $AZ_A$ and $AZ_E$ are the daily working times it takes to exceed the action value and exposure limit value and $V_{device}$ is the vibration value typical of the device.

The processor 22 includes a comparator 24 that compares the calculated daily working time it takes to exceed the action value and the exposure limit value to the determined effective daily operating time of the device 4 and gives an indication on a display 26 if the value is exceeded. The display 26 includes one green, one orange, and one red light-emitting diode 28, 30, 32; the green one 28 remains lit as long as the operation of the device in the working state has not exceeded the calculated daily working time it takes to exceed the action value. The orange light-emitting diode 30 lights up as soon as the effective daily operating time of the device 4 exceeds the calculated daily working time it takes to exceed the action value. The red light-emitting diode 32 is switched on when the exposure limit value is exceeded, namely when the determined effective daily operating time of the device 4 exceeds the calculated daily working time it takes to exceed the exposure limit value.

The evaluation electronics 18 also includes a reset circuit 34, which resets the determined effective daily operating time of the device 4 to zero if the device 4 is in the off state for longer than 8 hours. In addition, a reset button (not shown) is provided for resetting manually.

Figure 3:
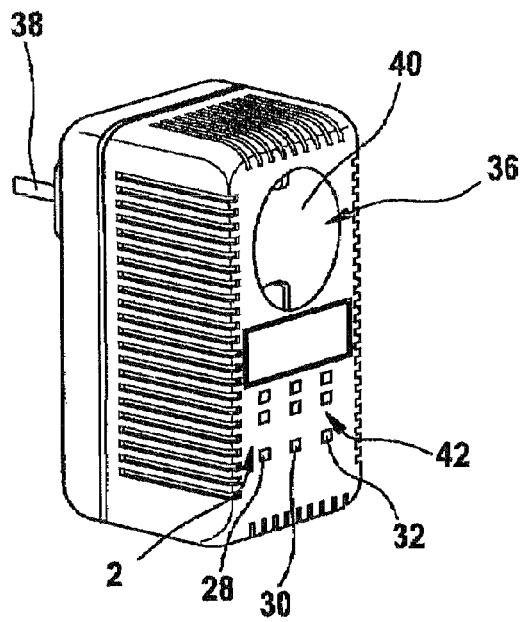
FIG. 3 is a perspective view of a power socket with a built-in vibration dosimeter.
Figure 4:
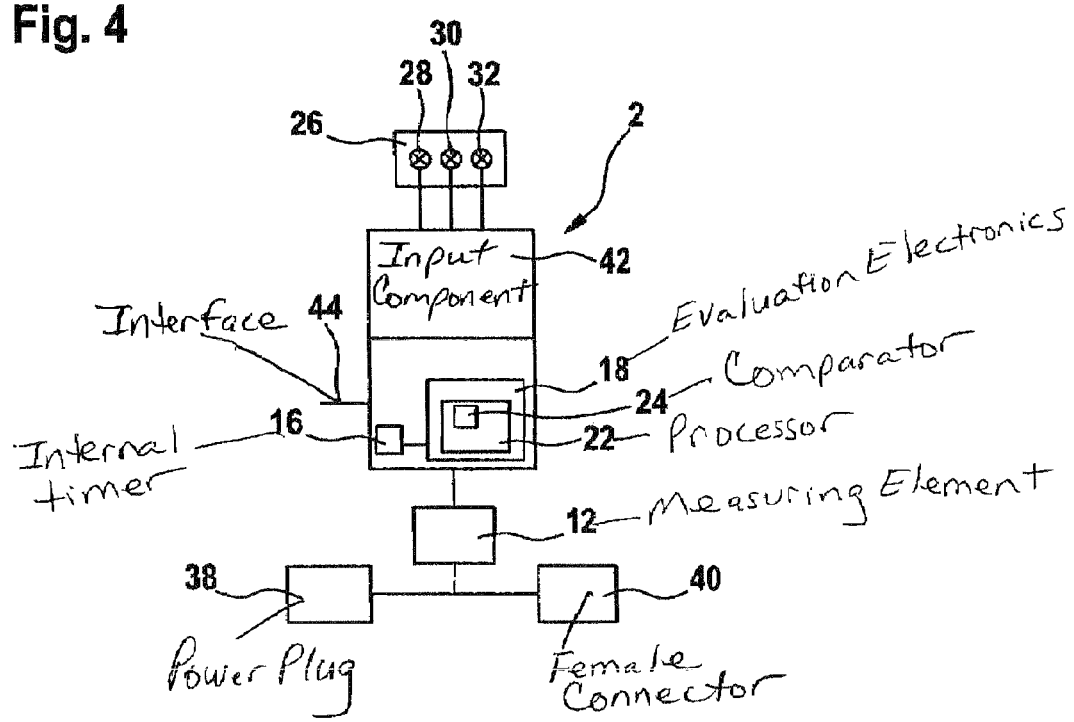
FIG. 4 is a schematic depiction of components of the vibration dosimeter built into the power socket.

In the dosimeter 2 shown in FIGS. 3 and 4, which is integrated into a power socket 36, the measuring element 12 measures the current flowing between a power plug 38 and a female connector 40 of the power socket 36. By contrast with the dosimeter 2 described above, an input component 42 is also provided, which offers the option of inputting into the dosimeter 2 the vibration value typical of the respective connected device 4, 6—obtained, for example, from an instruction manual—or changing it when switching to a different device 4, 6. As described previously, the evaluation electronics 18 determine the effective daily operating time of the respective connected device 4, 6 based on the current consumption in the working, idling, and standby states previously determined by means of reference measurements in order to compare the operating time to the daily working times it takes to exceed the action value and the exposure limit value, which times are calculated in accordance with equations (1) and (2) and to display excesses by activating the orange or red light-emitting diodes 30, 32 of the display 26 on the front side of the power socket 36.

The dosimeter 2 has an additional interface 44, for example a USB port, which makes it possible for the effective daily operating time—as well as off times and idling times of the connected device 4, 6, where appropriate—to be transmitted to a PC, for example, to enable more precise evaluation by the employer and to generate a report for compliance with EU Directive 2002/44.

Figure 5:
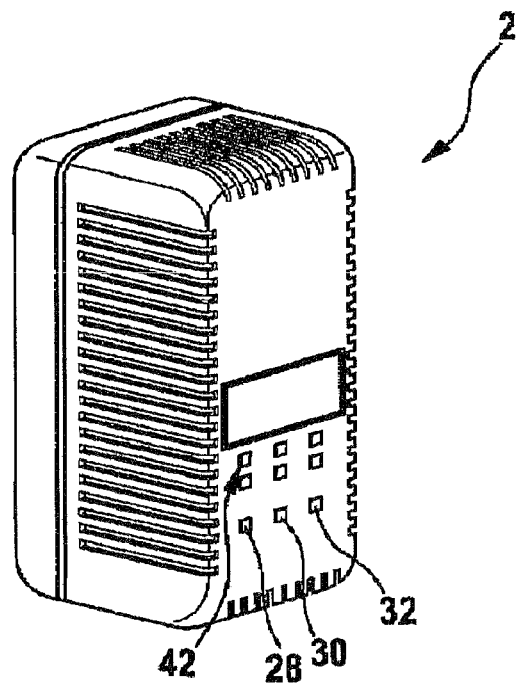
FIG. 5 is an enlarged perspective view of a vibration dosimeter for detachably fastening to a tool.
Figure 6:
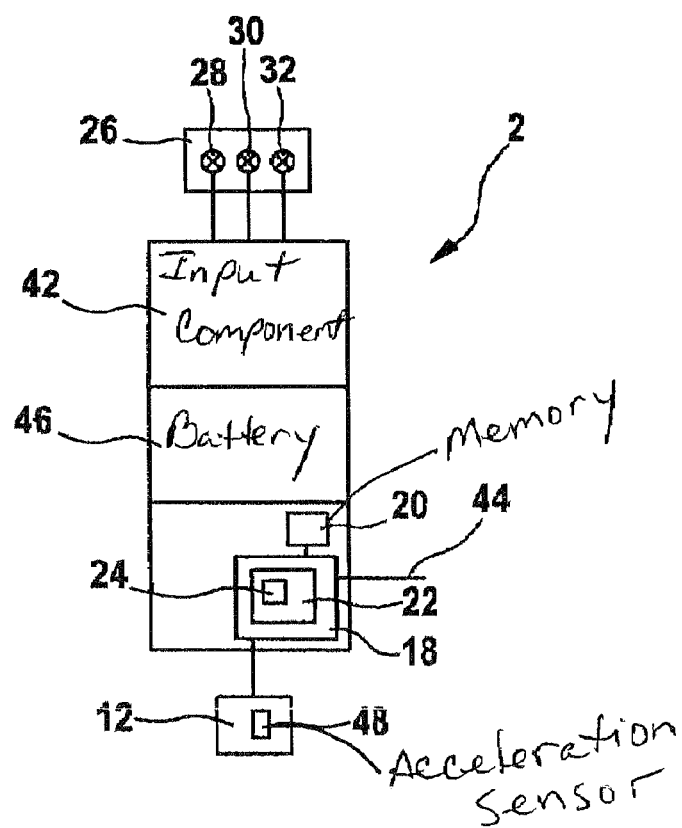
FIG. 6 is a schematic depiction of components of the vibration dosimeter from FIG. 5.

In the dosimeter 2 shown in FIGS. 5 through 7, which is powered by a battery 46 and mounted externally to the device 6, as shown in FIG. 7, in lieu of an ammeter, the measuring element 12 includes a simple acceleration sensor 48 with the aid of which a reference measurement of the acceleration level of the device 6 in the idling state and in the working state can be made and stored in the memory 20. By comparing the stored acceleration level to the acceleration measured by the acceleration sensor 48, the processor 22 determines the effective daily operating time of the device 6 in order to then compare it to the daily working time it takes to exceed the action value and the exposure limit value, which values, as before, are calculated in accordance with equations (1) and (2) based on a vibration value typical of the device that has been input into the dosimeter 2 by means of an input component 42 and based on the prescribed action value and exposure limit value.

If work is done using a different tool, then the dosimeter 2 is detached from the cordless rotary hammer 6 and attached to the other tool. Then the vibration value typical of the other tool is entered and by means of a reference measurement, its acceleration levels in the idling state and in the working state are determined and stored in the memory 20, whereupon the evaluation electronics 18 determine the effective daily operating time of the new tool and add it to the previously determined effective daily operating time of the cordless rotary hammer 6. As described above, an interface 44 can be provided for data transmission to a PC.

Figure 9:
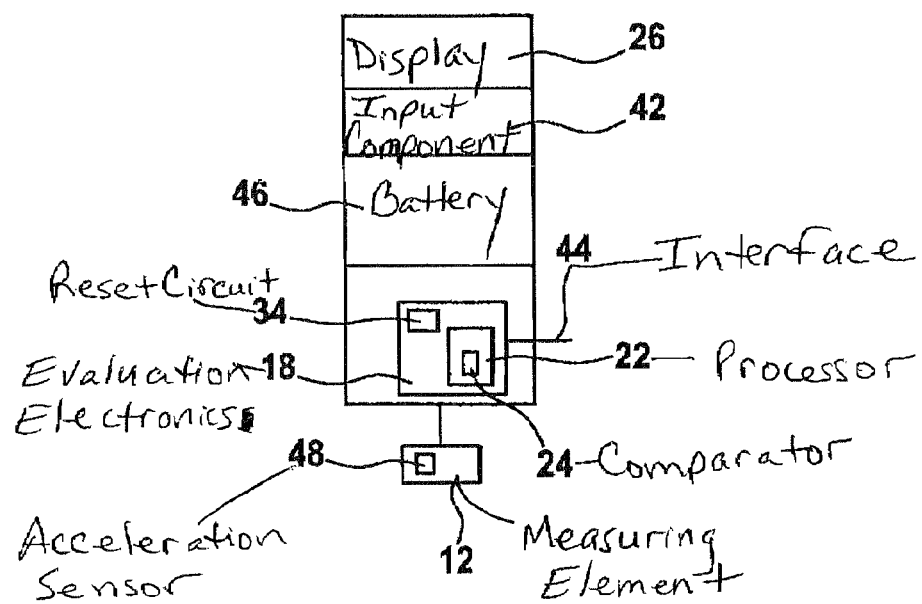
FIG. 9 is a schematic depiction of components of the vibration dosimeter from FIG. 8.

The dosimeter 2 shown in FIGS. 8 and 9, which is built into a wristwatch 50, functions in the same way as the above-described dosimeter 2 that can be mounted onto the device 4, 6 except for the fact that the accelerations measured by the acceleration sensor 48 are measured on the arm of the worker rather than directly on the device 4, 6, that the display 26 is embodied in the form of an LCD display, and that the timer 16 is comprised by a clockwork of the watch 50.

What is claimed is:

1. A vibration dosimeter for determining the daily vibration exposure of persons who are subjected to mechanical vibrations in their workplace by operating a tool, in particular a hand-guided power tool, characterized by means of a determination device (12, 18) for determining the effective daily operating time of the tool (4, 6), a calculating unit (22) for calculating a daily working time it takes to reach a prescribed vibration exposure action value and exposure limit value based on a vibration value typical of the tool and based on the action value and exposure limit value, as well as a comparing device (24) for comparing the determined effective daily operating time of the tool to the calculated daily working time it takes to reach the action value and the exposure limit value.

2. The vibration dosimeter as recited in claim 1, characterized by means of a device (34) for automatically resetting the determined effective daily operating time of the tool (4, 6) to zero after the expiration of a predetermined interruption in the operating time.

3. The vibration dosimeter as recited in claim 1, wherein it is built or integrated into the tool (4, 6).

4. The vibration dosimeter as recited in claim 1, wherein it is integrated into a wristwatch (50).

5. The vibration dosimeter as recited in claim 1, characterized by means of an input device (42) for entering a vibration value typical of the tool into the dosimeter (2).

6. The vibration dosimeter as recited in claim 1, characterized by means of a display unit (26), which indicates that the prescribed vibration exposure action value or exposure limit value has been exceeded if the determined effective daily operating time of the tool (4, 6) in the working state exceeds the calculated working time it takes to reach the prescribed vibration exposure action value or exposure limit value.

7. The vibration dosimeter as recited in claim 6, wherein the display unit (26) includes at least two differently colored light-emitting diodes (28, 30, 32).

8. The vibration dosimeter as recited in claim 1, wherein it is integrated into a power socket (36) for connecting an electric motor-driven tool (4, 6) to a power supply grid.

9. The vibration dosimeter as recited in claim 8, wherein the determination device (12, 18) determines the effective daily operating time of the tool (4, 6) based on the duration of the current consumption of the tool (4, 6) in the working state.

10. The vibration dosimeter as recited in claim 1, wherein it is fastenable to the tool (4, 6).

11. The vibration dosimeter as recited in claim 10, wherein it includes an acceleration sensor (48) and the determination device (12, 18) determines the effective daily operating time of the tool (4, 6) in the working state by comparing an acceleration measured by the acceleration sensor (48) to a reference acceleration in the working state that has been previously determined for the tool (4, 6).

12. A method for determining the daily vibration exposure of persons who are subjected to mechanical vibrations in their workplace by operating tools, wherein the effective daily operating time of the tool or each tool (4, 6) in a working state is determined and the determined effective daily operating time of the tool or each tool (4, 6) is compared to a respective working time it takes to exceed a prescribed vibration exposure action value or exposure limit value; the respective working time it takes to reach the prescribed action value or exposure limit value is calculated based on a vibration value typical of the respective tool (4, 6) and based on the prescribed action value and exposure limit value.

* * * * *